United States Patent
Liu

(10) Patent No.: US 12,538,330 B2
(45) Date of Patent: Jan. 27, 2026

(54) METHOD FOR TRIGGERING SIDELINK PRE-EMPTIVE BUFFER STATUS REPORT, RELAY DEVICE AND MEDIUM

(71) Applicant: SPREADTRUM COMMUNICATIONS (SHANGHAI) CO., LTD., Shanghai (CN)

(72) Inventor: Xing Liu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 346 days.

(21) Appl. No.: 18/032,989

(22) PCT Filed: Oct. 22, 2021

(86) PCT No.: PCT/CN2021/125586
§ 371 (c)(1),
(2) Date: Apr. 20, 2023

(87) PCT Pub. No.: WO2022/083726
PCT Pub. Date: Apr. 28, 2022

(65) Prior Publication Data
US 2023/0397229 A1    Dec. 7, 2023

(30) Foreign Application Priority Data
Oct. 22, 2020   (CN) ......................... 202011140334.0

(51) Int. Cl.
*H04W 72/25*   (2023.01)
*H04L 1/1829*   (2023.01)
(Continued)

(52) U.S. Cl.
CPC ........... *H04W 72/25* (2023.01); *H04L 1/1854* (2013.01); *H04W 72/12* (2013.01); *H04W 88/04* (2013.01)

(58) Field of Classification Search
CPC ..... H04W 72/25; H04W 72/12; H04W 88/04; H04W 28/0278; H04W 92/18;
(Continued)

(56) References Cited

U.S. PATENT DOCUMENTS

| 2008/0218426 A1 | 9/2008 | Qin et al. |
| 2010/0074222 A1 | 3/2010 | Wu |

(Continued)

FOREIGN PATENT DOCUMENTS

| CA | 2885890 A1 | 3/2014 |
| CN | 101262088 A | 9/2008 |

(Continued)

OTHER PUBLICATIONS

CATT, "Pre-emptive BSR", 3GPP TSG-RAN WG2 Meeting #107bis, R2-1912124, Oct. 14-18, 2019, 3 pages.
(Continued)

*Primary Examiner* — Ivan O Latorre
(74) *Attorney, Agent, or Firm* — CANTOR COLBURN LLP

(57) ABSTRACT

A method for triggering a sidelink pre-emptive buffer status report, a relay device and a medium are provided. The method includes: receiving sidelink control information and/or first data transmitted by a UE; determining whether there is an expectation of receiving second data in the future based on the sidelink control information and/or the first data; and triggering the pre-emptive BSR based on determining that there is the expectation of receiving the second data in the future; wherein the sidelink control information indicates the first data.

18 Claims, 3 Drawing Sheets

(51) Int. Cl.
*H04W 72/12* (2023.01)
*H04W 88/04* (2009.01)

(58) Field of Classification Search
CPC .......... H04W 72/569; H04W 28/0205; H04W 28/04; H04W 28/06; H04L 1/1854
See application file for complete search history.

(56) References Cited

U.S. PATENT DOCUMENTS

| | | | |
|---|---|---|---|
| 2010/0315311 A1 | 12/2010 | Touchard | |
| 2015/0236428 A1 | 8/2015 | Caratelli et al. | |
| 2017/0353819 A1* | 12/2017 | Yin | H04W 72/21 |
| 2019/0082446 A1* | 3/2019 | Guo | H04W 88/06 |
| 2019/0261237 A1* | 8/2019 | Yamazaki | H04W 76/14 |
| 2019/0334663 A1 | 10/2019 | Dev et al. | |
| 2020/0194889 A1 | 6/2020 | Hallivuori | |
| 2020/0196387 A1* | 6/2020 | Roy | H04W 4/80 |
| 2021/0076404 A1* | 3/2021 | Tsai | H04W 72/23 |
| 2021/0274545 A1* | 9/2021 | Adjakple | H04W 72/21 |
| 2021/0352700 A1* | 11/2021 | Lohr | H04W 72/21 |
| 2021/0367323 A1 | 11/2021 | Kang et al. | |
| 2022/0369187 A1* | 11/2022 | Ganesan | H04W 36/06 |
| 2023/0036769 A1* | 2/2023 | Wu | H04W 40/34 |
| 2023/0106128 A1* | 4/2023 | Lee | H04W 72/569 370/329 |
| 2023/0156758 A1* | 5/2023 | Fan | H04W 72/40 370/329 |
| 2023/0262508 A1* | 8/2023 | Liu | H04W 28/0278 370/252 |
| 2023/0276476 A1* | 8/2023 | Zhang | H04W 72/04 370/329 |
| 2023/0396964 A1* | 12/2023 | Liu | H04W 4/06 |
| 2023/0397229 A1* | 12/2023 | Liu | H04W 72/12 |
| 2023/0413106 A1* | 12/2023 | Wang | H04W 28/0278 |
| 2024/0015574 A1* | 1/2024 | Liu | H04W 28/0278 |

FOREIGN PATENT DOCUMENTS

| | | |
|---|---|---|
| CN | 101488602 A | 7/2009 |
| CN | 101686565 A | 3/2010 |
| CN | 104319488 A | 1/2015 |
| CN | 204809390 U | 11/2015 |
| CN | 105226390 A | 1/2016 |
| CN | 111107654 A | 5/2020 |
| CN | 111293428 A | 6/2020 |
| CN | 113923711 A | 1/2022 |
| EP | 4181565 A1 | 5/2023 |
| WO | 2018202120 A1 | 11/2018 |

OTHER PUBLICATIONS

Huawei et al., "Clarification of BSR and Pre-emptive BSR", 3GPP TSG-RAN WG2 Meeting #109bis electronic, R2-2003018, Apr. 20-30, 2020, 6 pages.
CATT, "User and Control Plane Procedures for L2 UE-to-NW Relay"; 3GPP TSG-RAN WG2 Meeting #111-3; Electronic, Aug. 17-28, 2020; R2-2006610; 7 pages.
EPO Extended European Search Report for corresponding EP Application No. 21882140.3; Issued Mar. 4, 2024; 13 pages.
HiSilicon Huawei, "Differentiation between Pre-emptive BSR MAC CE and BSR MAC CE"; 3GPP TSG-RAN WG2 Meeting #110 electronic, Jun. 1-Jun. 12, 2020; R2-2005522; 3 pages.
Spreadtrum, "[Draft] LS on priority indication in SCI" 3GPP TSG-RAN WG2 Meeting #108; Reno, Nevada, US, Nov. 18-22, 2019; R2-1915014; 1 page.
International Search Report corresponding to International Application No. PCT/CN2021/125586; Mailing Date, Dec. 21, 2021.
Silva et al., "Using a Multilayer Perceptrons for Accurate Modeling of Quasi-Fractal Patch Antennas", 2010, 4 pages.
Futurewei, "Enhancements for low-latency IAB Uplink scheduling," 3GPP TSG-RAN meeting #107bis, R2-1913539 (revision of R2-1911438); Chongqing, China, Oct. 14 -18, 2019; 5 pages.
SIPO First Office Action for corresponding CN Application No. 202011140334.0; Issued Jan. 26, 2025.

* cited by examiner

METHOD FOR TRIGGERING SIDELINK PRE-EMPTIVE BUFFER STATUS REPORT, RELAY DEVICE AND MEDIUM

CROSS-REFERENCE TO RELATED APPLICATIONS

This is the U.S. national stage of application No. PCT/CN2021/125586, filed on Oct. 22, 2021. Priority under 35 U.S.C. § 119(a) and 35 U.S.C. § 365(b) is claimed from Chinese Application No. 202011140334.0, filed Oct. 22, 2020, the disclosure of which is also incorporated herein by reference.

TECHNICAL FIELD

The present disclosure generally relates to radio communication technology field, and more particularly, to a method for triggering a sidelink pre-emptive Buffer Status Report (BSR), a relay device and a medium.

BACKGROUND

Sidelink communication technology is different from traditional wireless cellular network communication. In a traditional cellular network, a User Equipment (UE) communicates with a base station, where a link between the UE and the base station is called an Uplink (UL) or a Downlink (DL), and an interface is called Uu interface. However, in the sidelink communication, a UE directly communicates with another UE, where a link between the UEs is called a Sidelink (SL), and an interface is called PC5 interface.

In LTE and NR, to obtain uplink transmission resources, a UE needs to feed back to a base station a BSR which indicates a specific amount of data to be transmitted when a condition is met. In NR, Integrated Access Backhaul (IAB) technology is further introduced, and its specific architecture is illustrated in FIG. 3. A characteristic of the IAB architecture lies in that a transmission mechanism of NR Uu (Uu refers to the interface when the base station and the UE are in sidelink communication) is adopted between an IAB node and a base station, and between an IAB node and a UE. The IAB node can act as a relay.

As the Uu transmission mechanism is still adopted between the IAB node and the UE, uplink resources of the UE are also allocated by the IAB node, and uplink resources of the IAB node are allocated by the base station, in the IAB architecture. Therefore, the UE needs to transmit a BSR request resource to the IAB node, and the IAB node needs to transmit a BSR request resource to the base station, thereby resulting in additional transmission delay.

To reduce the transmission delay, a pre-emptive BSR mechanism is introduced into the IAB architecture. When the IAB node receives a BSR from the UE, or when the IAB node allocates uplink transmission resources to the UE, it is triggered to transmit a pre-emptive BSR to the base station. That is to tell the base station in advance that although data has not been received, it is expected how much data needs to be transmitted so that the base station can schedule resources in advance. Here, the BSR indicates size information of existing data, and the pre-emptive BSR indicates a predicted size information of the data to be received.

SUMMARY

Embodiments of the present disclosure may enable pre-emptive BSR triggering to be used in a sidelink relay structure.

In an embodiment of the present disclosure, a method for triggering a sidelink pre-emptive BSR is provided, including: receiving sidelink control information and/or first data transmitted by a UE; determining whether there is an expectation of receiving second data in the future based on the sidelink control information and/or the first data; and triggering the pre-emptive BSR based on determining that there is the expectation of receiving the second data in the future; wherein the sidelink control information indicates the first data.

In an embodiment of the present disclosure, a non-volatile or non-transitory computer-readable storage medium having computer instructions stored therein is provided, wherein when the computer instructions are executed, any one of the above methods is performed.

In an embodiment of the present disclosure, a relay device including a memory and a processor is provided, wherein the memory has computer instructions stored therein, and when the processor executes the computer instructions, any one of the above methods is performed.

DETAILED DESCRIPTION

Figure 4:
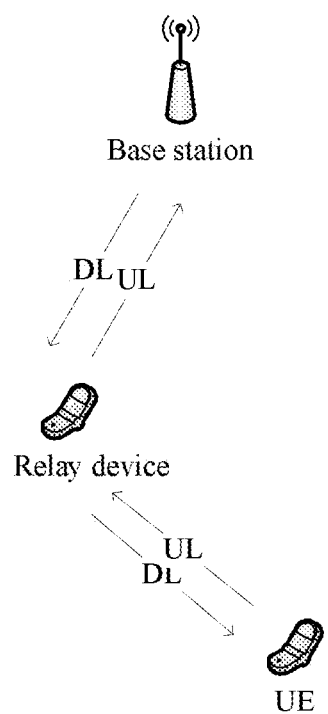
FIG. 4 is a structural diagram of a traditional relay in existing techniques.
Figure 5:
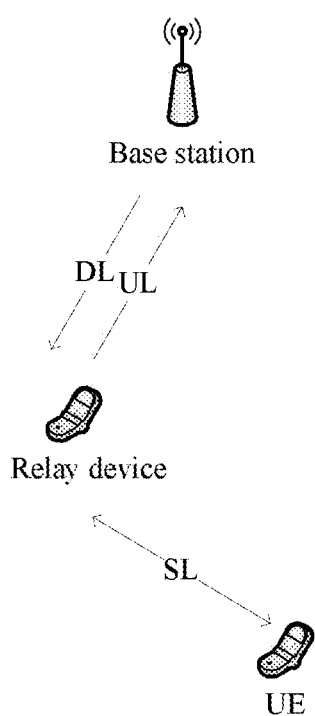
FIG. 5 is a structural diagram of a sidelink relay in existing techniques.

FIG. 4 is a structural diagram of a traditional relay in existing techniques. A base station and a relay device communicate through uplink and downlink, and the relay device and a UE communicate through uplink and downlink. FIG. 5 is a structural diagram of a sidelink relay in existing techniques. Different from FIG. 4, in FIG. 5, the relay device communicates with the UE through Sidelink (SL).

In a sidelink relay structure, a transmission resource of the UE is not allocated by an IAB node, but is grabbed by the UE from a shared resource pool through the preemption mechanism. Therefore, the pre-emptive BSR trigger condition introduced in an existing IAB architecture cannot be applied in a sidelink relay structure. Therefore, a pre-emptive BSR trigger condition introduced in the existing IAB architecture cannot be used in the sidelink relay structure. In other words, in the existing sidelink relay structure, the pre-emptive BSR cannot be triggered, resulting in transmission delay.

In embodiments of the present disclosure, after receiving first data from a UE, if it is determined that there is an expectation of receiving second data in the future, a pre-emptive BSR is triggered to realize trigger of the pre-emptive BSR in a sidelink relay.

In order to clarify the objects, characteristics and advantages of the disclosure, embodiments of present disclosure will be described in detail in conjunction with accompanying drawings.

Figure 1:
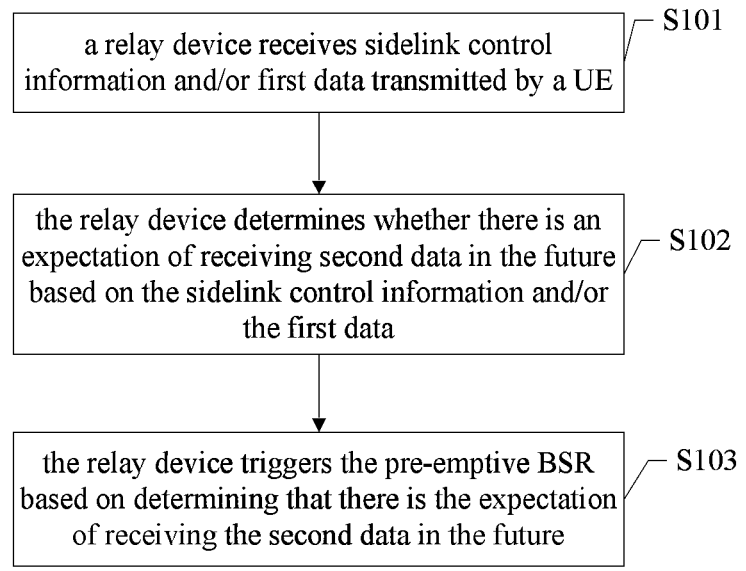
FIG. 1 is a flow chart of a method for triggering a sidelink pre-emptive BSR according to an embodiment.

In an embodiment, a method for triggering a ple-emptive BSR is provided. Referring to FIG. 1, details of the method are provided via specific steps below.

In some embodiments, the method including S101 to S103 may be performed by a chip (such as a baseband chip) with a data processing function in a relay device, or by a chip module containing a chip (such as a baseband chip) with a data processing function in the relay device.

In S101, a relay device receives sidelink control information and/or first data transmitted by a UE.

In some embodiments, the relay device may receive the Sidelink Control Information (SCI) transmitted by the UE; or, the relay device may receive first data transmitted by the UE, wherein the first data may be uplink data or other data; or, the relay device may receive both the sidelink control information and the first data from the UE.

In some embodiments, when the relay device receives both the sidelink control information and the first data from the UE, the sidelink control information is used to indicate the first data. For example, the sidelink control information indicates a position of a time-frequency resource where the first data is located, a modulation and coding method used by the first data, etc. The relay device can correctly decode the first data according to the sidelink control information.

In S102, the relay device determines whether there is an expectation of receiving second data in the future based on the sidelink control information and/or the first data.

In some embodiments, after receiving the sidelink control information and/or the first data from the UE, the relay device may determine whether there is an expectation of receiving data in the future based on the received sidelink control information and/or first data. There being an expectation of receiving data in the future means that the relay device predicts that the UE will continue to transmit data within a subsequent period of time.

In some embodiments, when receiving the first data from the UE, the relay device may decode the first data. If it is detected that the decoding of the first data fails, the UE may probably retransmit the first data that fails to be decoded to the relay device. Accordingly, the relay device may determine that there is an expectation of receiving data in the future.

In some embodiments, based on detecting that the decoding of the first data at a first time fails, it may be determined that there is an expectation of receiving second data in the future. In some embodiments, when the received data fails to be decoded for N consecutive times, it is determined that there is an expectation of receiving second data in the future, where N≥2.

In some embodiments, in response to receiving the first data from the UE, the relay device decodes the first data. If the decoding of the first data fails, a HARQ NACK may be fed back to the UE. After receiving the HARQ NACK fed back by the relay device, the UE may probably retransmit the first data that fails to be decoded to the relay device. Accordingly, the relay device may determine that there is an expectation of receiving second data in the future.

In some embodiments, based on detecting that the decoding of the first data at the first time fails, and feeding back the HARQ NACK to the UE, it is determined that there is an expectation of receiving data in the future. That is, if the relay device fails to decode data but it is not the first decoding failure, although the relay device may still need to feed back the HARQ NACK to the UE, the relay device may determine that there is no expectation of receiving second data in the future.

It could be understood that if the relay device fails to decode the first data and the first data is not transmitted for a first time, the relay device may also determine that there is an expectation of receiving second data in the future.

In some embodiments, the relay device receives the sidelink control information transmitted by the UE, and if the sidelink control information indicates that there is a reserved resource position for data transmission, the relay device may determine that there is an expectation of receiving second data in the future.

In some embodiments, the relay device receives the sidelink control information and the first data from the UE. If the first data is decoded successfully, and the sidelink control information indicates that there is a reserved resource position for data transmission, the relay device may determine that there is an expectation of receiving data in the future.

In S103, the relay device triggers the pre-emptive BSR based on determining that there is the expectation of receiving the second data in the future.

In some embodiments, after determining that there is the expectation of receiving the second data in the future, the relay device may trigger the pre-emptive BSR, and generate and transmit the pre-emptive BSR to the base station.

In some embodiments, the relay device receives the sidelink control information and/or the first data from the UE, and determines that there is an expectation of receiving second data in the future. Afterward, the relay device may first obtain a priority corresponding to the currently received sidelink control information and a priority of a pre-emptive BSR transmitted last time. In the embodiments, for brief, the priority corresponding to the currently received sidelink control information is referred to as a first priority, and the priority of the pre-emptive BSR transmitted last time is referred to as a second priority.

In some embodiments, the relay device may compare the first priority with the second priority, and trigger the pre-emptive BSR based on that the first priority is higher than the second priority, or not trigger the pre-emptive BSR based on that the first priority is not higher than the second priority.

The priority of the sidelink control information is obtained, and the pre-emptive BSR is triggered merely when the priority of the currently received sidelink control information is relatively high, thereby fully utilizing radio resources of the relay device and reducing power consumption of the relay device.

It could be understood that if the first priority is not higher than the second priority, the pre-emptive BSR may also be triggered. However, frequent triggering of the pre-emptive BSR may cause much occupancy of radio resources of the relay device and consume more power. In practical applications, whether to perform priority comparison may be determined according to specific application requirements.

In some embodiments, after receiving the sidelink control information and/or the first data from the UE, and determining that there is the expectation of receiving the second data in the future, the relay device may obtain a first data volume indicated by the sidelink control information and a second data volume indicated by the pre-emptive BSR transmitted last time, and trigger the pre-emptive BSR based on that the first data volume is greater than the second data volume.

In some embodiments, after receiving the sidelink control information and/or the first data from the UE, and determining that there is the expectation of receiving the second data in the future, the relay device may obtain a third data volume of the first data and the second data volume indicated by the pre-emptive BSR transmitted last time, and trigger the pre-emptive BSR based on that the third data volume is greater than the second data volume.

Based on comparison of data volumes, the pre-emptive BSR is triggered when the data volume of data to be transmitted is relatively great, thereby fully utilizing radio resources of the relay device and reducing power consumption of the relay device.

It could be understood that if the first data volume is not greater than the second data volume, the pre-emptive BSR may also be triggered. However, frequent triggering of the pre-emptive BSR may cause much occupancy of radio resources of the relay device and consume more power. In practical applications, whether to perform data volume comparison may be determined according to specific application requirements.

In some embodiments, after the pre-emptive BSR is triggered, the pre-emptive BSR may be generated.

In some embodiments, if the pre-emptive BSR is triggered by a failure in the decoding of the first data by the relay device, the pre-emptive BSR includes priority information of the sidelink control information, i.e., the first priority of the currently received sidelink control information.

In some embodiments, if the pre-emptive BSR is triggered by a failure in the decoding of the first data by the relay device and the HARQ NACK being fed back by the relay device to the UE, the pre-emptive BSR includes priority information of the sidelink control information, i.e., the first priority of the currently received sidelink control information.

In some embodiments, if the pre-emptive BSR is triggered by a success in the decoding of the first data by the relay device and the sidelink control information indicating that there are unsent resources, the pre-emptive BSR includes the first priority of the sidelink control information.

In a specific application, if the pre-emptive BSR is triggered by the relay device successfully decoding the currently received first data and the currently received sidelink control information also indicating that there are unsent resources subsequently, the current pre-emptive BSR generated by the relay device may not include the first priority of the currently received sidelink control information to reduce length of the current pre-emptive BSR, as priorities of data corresponding to the unsent resources are unknown.

In some embodiments, if the pre-emptive BSR is triggered by the sidelink control information indicating that there are unsent resources, the pre-emptive BSR includes the first priority of the sidelink control information.

In a specific application, if the pre-emptive BSR is triggered by the currently received sidelink control information also indicating that there are unsent resources subsequently, the current pre-emptive BSR generated by the relay device may not include the first priority of the currently received sidelink control information to reduce length of the current pre-emptive BSR, as priorities of data corresponding to the unsent resources are unknown.

In some embodiments, the first priority may occupy 8 bits some or all of which are used to represent the first priority.

In some embodiments, the current pre-emptive BSR may also include the first data volume indicated by the current sidelink control information.

In some embodiments, the first data volume may occupy 8 bits some or all of which are used to represent the first data volume.

In some embodiments, the current pre-emptive BSR may also include the third data volume of the first data.

In some embodiments, the third data volume may occupy 8 bits some or all of which are used to represent the third data volume.

It could be understood that a number of bits occupied by the first data volume may be greater than 8, for example, 16 or more. A number of bits occupied by the third data volume may also be greater than 8, for example, 16 or more.

From above, after receiving the first data from the UE, if it is determined that there is the expectation of receiving the second data in the future, the pre-emptive BSR is triggered to realize trigger of the pre-emptive BSR in the sidelink relay.

Figure 2:
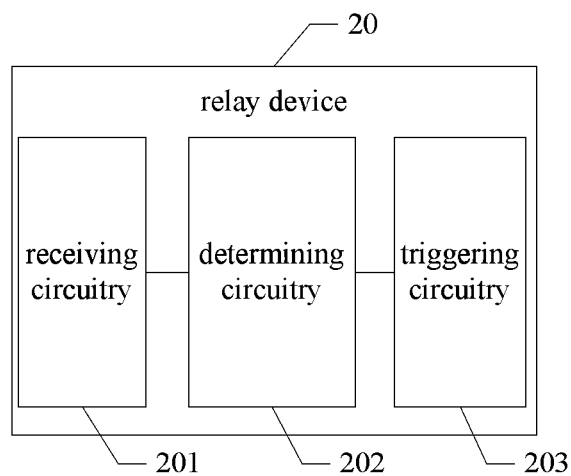
FIG. 2 is a structural diagram of a relay device.
Figure 3:
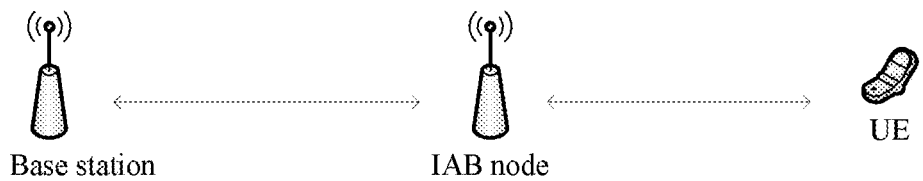
FIG. 3 is a structural diagram of an TAB.

FIG. 2 is a structural diagram of a relay device 20 according to an embodiment. The relay device 20 includes a receiving circuitry 201, a determining circuitry 202 and a triggering circuitry 203.

The receiving circuitry 201 is configured to receive sidelink control information and/or first data transmitted by a UE.

The determining circuitry 202 is configured to determine whether there is an expectation of receiving second data in the future based on the sidelink control information and/or the first data.

The triggering circuitry 203 is configured to trigger a pre-emptive BSR based on that there is the expectation of receiving the second data in the future; wherein the sidelink control information indicates the first data.

In some embodiments, more details of the receiving circuitry 201, the determining circuitry 202 and the triggering circuitry 203 may be referred to the above descriptions of S101 to S103, and are not repeated here.

In some embodiments, modules/units included in each apparatus and product described in the above embodiments may be software modules/units, hardware modules/units, or a combination of software modules/units and hardware modules/units.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a non-volatile or non-transitory computer-readable storage medium having computer instructions stored therein is provided, wherein when the computer instructions are executed by a processor, the method for triggering the sidelink pre-emptive buffer status report provided in any one of the above embodiments is performed.

In an embodiment of the present disclosure, a relay device which includes a memory and a processor is provided, wherein the memory has computer instructions stored therein, and when the processor executes the computer instructions, the method for triggering the sidelink pre-emptive buffer status report provided in any one of the above embodiments is performed.

Those skilled in the art could understand that all or part of steps in the various methods in the above embodiments can be completed by instructing relevant hardware through a program, and the program can be stored in any computer-readable storage medium which includes a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for triggering a sidelink pre-emptive Buffer Status Report (BSR), comprising:
   receiving sidelink control information and/or first data transmitted by a User Equipment (UE);
   determining whether there is an expectation of receiving second data in the future based on the sidelink control information and/or the first data; and
   triggering the pre-emptive BSR based on determining that there is the expectation of receiving the second data in the future;
   wherein the sidelink control information indicates the first data;
   wherein said triggering the pre-emptive BSR based on determining that there is the expectation of receiving the second data in the future comprises any one of following:
   obtaining a first priority of the sidelink control information and a second priority of a pre-emptive BSR transmitted last time, and triggering the pre-emptive BSR based on that the first priority is higher than the second priority;
   obtaining a first data volume indicated by the sidelink control information and a second data volume indicated by the pre-emptive BSR transmitted last time, and triggering the pre-emptive BSR based on that the first data volume is greater than the second data volume; or
   obtaining a third data volume of the first data and the second data volume indicated by the pre-emptive BSR transmitted last time, and triggering the pre-emptive BSR based on that the third data volume is greater than the second data volume.

2. The method according to claim 1, wherein said determining whether there is an expectation of receiving second data in the future based on the sidelink control information and/or the first data comprises:
   determining that there is the expectation of receiving the second data in the future based on that decoding of the first data fails;
   feeding back a Hybrid Automatic Repeat reQuest (HARQ) Negative Acknowledgement (NACK) to the UE and determining that there is the expectation of receiving the second data in the future based on that decoding of the first data fails; or
   determining that there is the expectation of receiving the second data in the future based on the sidelink control information indicating that there are unsent resources.

3. The method according to claim 2, wherein said determining that there is the expectation of receiving the second data in the future based on that decoding of the first data fails comprises:
   determining that there is the expectation of receiving the second data in the future based on that decoding of the first data at a first time fails.

4. The method according to claim 2, wherein said feeding back a HARQ NACK to the UE and determining that there is the expectation of receiving the second data in the future based on that decoding of the first data fails comprises:
   feeding back the HARQ NACK to the UE and determining that there is the expectation of receiving the second data in the future based on that decoding of the first data at a first time fails.

5. The method according to claim 1, further comprising:
   generating the pre-emptive BSR following triggering the pre-emptive BSR.

6. The method according to claim 5, wherein the pre-emptive BSR comprises the first priority of the sidelink control information based on that the decoding of the first data fails.

7. The method according to claim 5, wherein the pre-emptive BSR comprises the first priority of the sidelink control information based on that the decoding of the first data fails and the HARQ NACK is fed back to the UE.

8. The method according to claim 5, wherein the pre-emptive BSR comprises the first priority of the sidelink control information based on that the decoding of the first data succeeds and the sidelink control information indicates that there are unsent resources; or
   the pre-emptive BSR does not comprise the first priority of the sidelink control information based on that the decoding of the first data succeeds and the sidelink control information indicates that there are unsent resources.

9. The method according to claim 5, wherein the pre-emptive BSR comprises the first data volume indicated by the sidelink control information; or
   the pre-emptive BSR comprises the third data volume of the first data.

10. A non-volatile or non-transitory computer readable storage medium storing one or more programs, the one or more programs comprising computer instructions, which, when executed by a processor, cause the processor to:
    receive sidelink control information and/or first data transmitted by a User Equipment (UE);
    determine whether there is an expectation of receiving second data in the future based on the sidelink control information and/or the first data; and
    trigger a pre-emptive Buffer Status Report (BSR) based on determining that there is the expectation of receiving the second data in the future;
    wherein the sidelink control information indicates the first data;
    wherein the processor is further caused to:
    obtain a first priority of the sidelink control information and a second priority of a pre-emptive BSR transmitted last time, and trigger the pre-emptive BSR based on that the first priority is higher than the second priority;
    obtain a first data volume indicated by the sidelink control information and a second data volume indicated by the pre-emptive BSR transmitted last time, and trigger the pre-emptive BSR based on that the first data volume is greater than the second data volume; or obtain a third data volume of the first data and the second data volume indicated by the pre-emptive BSR transmitted last time, and trigger the pre-emptive BSR based on that the third data volume is greater than the second data volume.

11. A relay device comprising a memory and a processor, wherein the memory stores one or more programs, the one or more programs comprising computer instructions, which, when executed by the processor, cause the processor to:
receive sidelink control information and/or first data transmitted by a User Equipment (UE);
determine whether there is an expectation of receiving second data in the future based on the sidelink control information and/or the first data; and
trigger a pre-emptive Buffer Status Report (BSR) based on determining that there is the expectation of receiving the second data in the future;
wherein the sidelink control information indicates the first data;
wherein the processor is further caused to:
obtain a first priority of the sidelink control information and a second priority of a pre-emptive BSR transmitted last time, and trigger the pre-emptive BSR based on that the first priority is higher than the second priority;
obtain a first data volume indicated by the sidelink control information and a second data volume indicated by the pre-emptive BSR transmitted last time, and trigger the pre-emptive BSR based on that the first data volume is greater than the second data volume; or
obtain a third data volume of the first data and the second data volume indicated by the pre-emptive BSR transmitted last time, and trigger the pre-emptive BSR based on that the third data volume is greater than the second data volume.

12. The relay device according to claim 11, wherein the processor is further caused to:
determine that there is the expectation of receiving the second data in the future based on that decoding of the first data fails;
feed back a Hybrid Automatic Repeat reQuest (HARQ) Negative Acknowledgement (NACK) to the UE and determine that there is the expectation of receiving the second data in the future based on that decoding of the first data fails; or
determine that there is the expectation of receiving the second data in the future based on the sidelink control information indicating that there are unsent resources.

13. The relay device according to claim 12, wherein the processor is further caused to:
determine that there is the expectation of receiving the second data in the future based on that decoding of the first data at a first time fails.

14. The relay device according to claim 12, wherein the processor is further caused to:
feed back the HARQ NACK to the UE and determine that there is the expectation of receiving the second data in the future based on that decoding of the first data at a first time fails.

15. The relay device according to claim 11, wherein the processor is further caused to:
generate the pre-emptive BSR following triggering the pre-emptive BSR.

16. The relay device according to claim 15, wherein the pre-emptive BSR comprises the first priority of the sidelink control information based on that the decoding of the first data fails.

17. The relay device according to claim 15, wherein the pre-emptive BSR comprises the first priority of the sidelink control information based on that the decoding of the first data fails and the HARQ NACK is fed back to the UE.

18. The relay device according to claim 15, wherein the pre-emptive BSR comprises the first priority of the sidelink control information based on that the decoding of the first data succeeds and the sidelink control information indicates that there are unsent resources; or
the pre-emptive BSR does not comprise the first priority of the sidelink control information based on that the decoding of the first data succeeds and the sidelink control information indicates that there are unsent resources.

* * * * *